United States Patent Office 3,132,998
Patented May 12, 1964

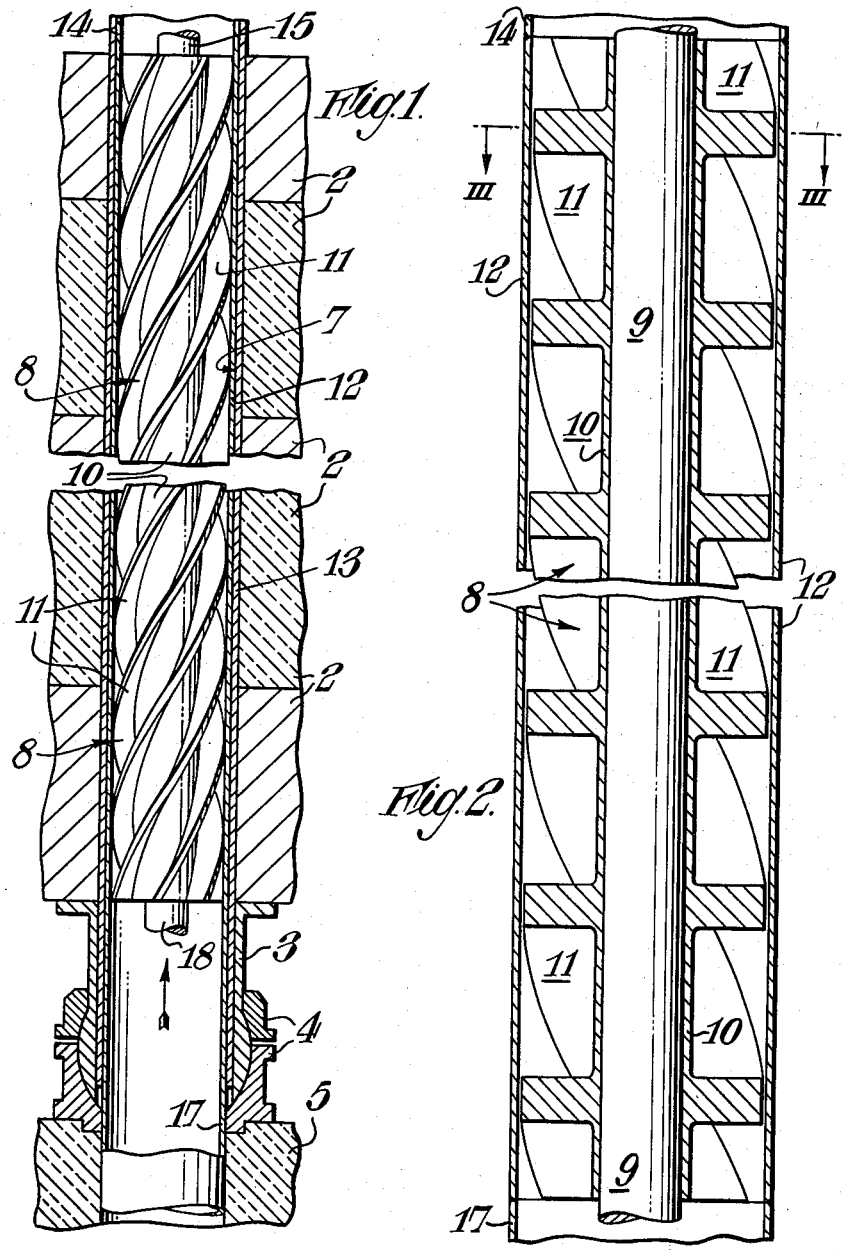

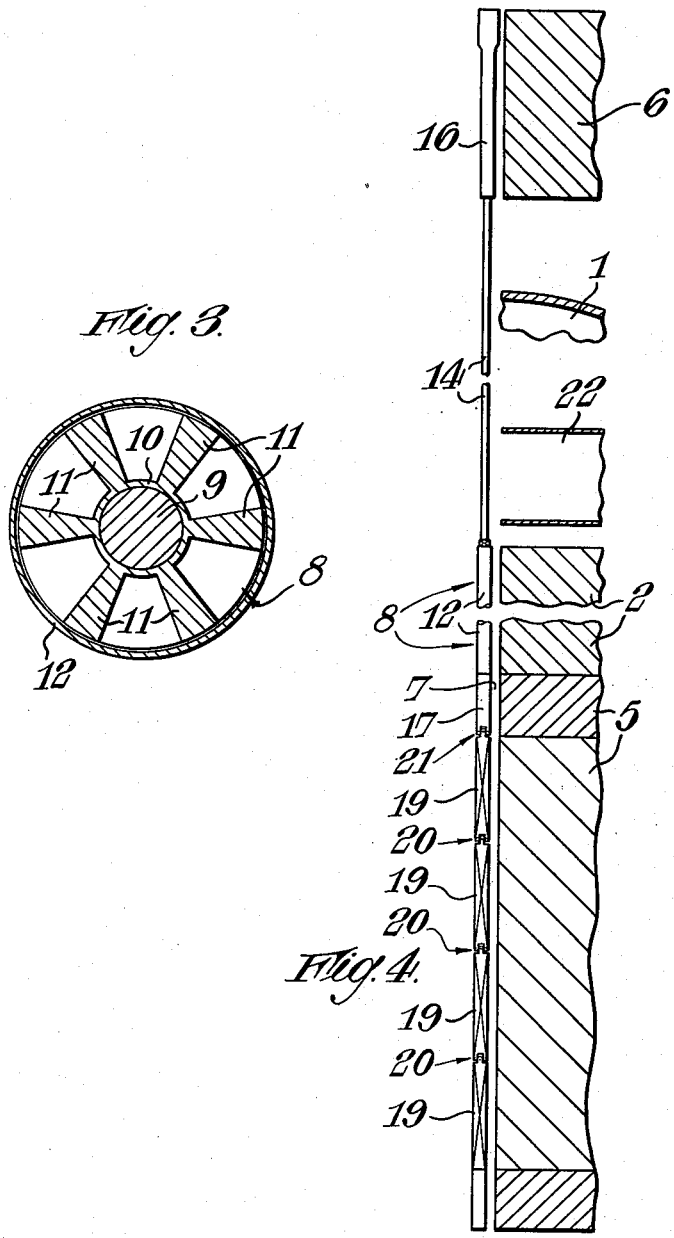

3,132,998
NUCLEAR REACTORS
Everett Long and William Rodwell, Culcheth, near Warrington, England, assignors to United Kingdom Atomic Energy Authority, London, England
Filed Aug. 17, 1959, Ser. No. 834,190
Claims priority, application Great Britain Sept. 1, 1958
3 Claims. (Cl. 176—43)

This invention relates to neutron shields for nuclear reactors.

In fluid-cooled, solid, for example graphite moderated power-producing reactors in which it is aimed to reduce the cost of generation of power, high operating temperatures and high fuel ratings are considered to be essential. The conditions of high temperature and neutron flux resulting from high fuel rating may affect the moderator structure to an extent such as to necessitate replacement thereof, and to this end, it is desirable to provide an internal neutron shield having high neutron absorbing characteristics and disposed between the moderator structure and an access region of the pressure vessel containing the moderator structure. The neutron shield functions to reduce the accumulation of activity in the steelwork in the access region and also enables the moderator structure to be removed, either by dismantling or in its entirety, after shut-down of the reactor and removal of a part of the pressure vessel, the internal neutron shield serving to protect personnel engaged in affecting the latter removal. The usual biological shield surrounding the pressure vessel will of course continue to be provided, but the existence of the internal neutron shield will make it possible for the thickness of the biological shield in the vicinity of the access region to be reduced because of the extra neutron absorbing capacity of the internal neutron shield.

However, where charging and discharging is effected at the access region, the internal neutron shield must be breached by passages allowing insertion of fuel elements into fuel element channels in the moderator structure and removal of fuel elements therefrom, and by passages to enable control and shut-off rods to be operated. In designs where the coolant is led off from a header beyond the internal neutron shield, passages must of necessity be provided for the coolant to reach the header. The fuel element passages in the internal neutron shield conveniently allow coolant to flow during discharging of irradiated fuel elements, which serves to cool the elements and also to cool the neutron shield. However, when no charging or discharging of fuel elements is taking place, the neutron shield must, when the reactor is in operation, continue to provide passage for coolant to reach the header whilst at the same time function to prevent neutrons from traversing the shield.

It is of course possible to plug the passages in the neutron shield for charging and discharging of fuel elements with massive shield plugs having neutron absorbing characteristics, as is customary with the charge tubes in present external biological shields, and to provide off-set passages in the neutron shield for coolant to flow to the header. However, this solution increases pressure drop of coolant across the neutron shield, which is expensive of pumping power, and furthermore leads to an excessive size of neutron shield in order to accommodate the offset passages.

It is an object of the present invention to provide a neutron shield having shielding for its fuel element passages which is removable during actual charging or discharging but which when in position permits the flow of coolant through the passages without substantial pressure drop across the neutron shield.

According to the invention, a neutron shield provided with passages has a shielding device in each passage, the shielding device having a plurality of surfaces arranged so as to scatter neutrons and thereby cause them to be absorbed in the neutron shield whilst permitting a flow of fluid coolant through the passages without substantial pressure drop across the neutron shield.

Where the neutron shield is disposed internally in the pressure vessel of a fluid cooled, moderated nuclear reactor, and the said passages are employed for fuel element charging or discharging, each shielding device is conveniently connected to a fuel element or to a connected column of fuel elements so as to be insertable in a passage on charging and removable therefrom on discharging.

Each shielding device may be connected to a plug adapted to seal a charge tube in an external biological shield of the reactor.

In order that the invention may be fully understood and more readily carried into practice, we have caused to be appended hereunto drawings illustrating a constructional example thereof, wherein—

FIGURE 1 is a fragmentary side view, partly in medial section, of a channel in a part of a neutron shield for a nuclear reactor and a shielding device for said channel, FIGURE 2 is a fragmentary side view in medial section of the shielding device shown in FIGURE 1, drawn to a larger scale than that of FIGURE 1, FIGURE 3 is a plan view in section taken on line III—III of FIGURE 2, and FIGURE 4 is a diagrammatic side view of a shielding device shown in relation to other parts with which it is associated in use, drawn to a smaller scale than that of FIGURE 1.

Referring to the drawings, in the construction shown therein, as applied by way of example to a gas-cooled, graphite-moderated nuclear reactor, there is disposed within the reactor pressure vessel (a part of which is shown in FIGURE 4 and designated 1) an upper internal neutron shield, part of which is shown in FIGURES 1 and 4 and designated 2, carried by a plurality of supporting feet (one of which is shown in FIGURE 1 and designated 3) each mounted in a socket 4 supported by the top of the graphite moderator structure, part of which is shown in FIGURES 1 and 4 and designated 5. Each socket 4 allows a degree of angular movement of the respective foot 3.

The neutron shield 2 has a plurality of vertical channels each axially aligned with a corresponding fuel element channel in the moderator structure 5 and with a corresponding access or charge tube in the upper biological shield (a part of which is shown in FIGURE 4 and designated 6). FIGURES 1 and 4 show one such channel 7 in the neutron shield 2. In order to prevent the passage along the channel 7 of such neutrons as may escape from the moderator structure 5 whilst allowing the relatively unrestricted flow of gaseous coolant along the channel 7, a shielding device generally indicated by the reference numeral 8 is provided with the object of presenting a number of obstacles to the straight line path of neutrons thereby causing them to be scattered and absorbed in the neutron shield, whilst at the same time providing a path for gaseous coolant which is not so tortuous as to cause an appreciable pressure drop in the coolant. To this end, the shielding device consists of a central rod 9 sheathed by a tubular member 10 provided with a plurality of helical ribs or fins 11 just contacting an outer tube 12. A tubular member 10 provided with six helical ribs or fins 11 just contacting an outer tube 12 and each fin completing four turns over its length. Conveniently the fins 11 are integral with the tubular member 10 but they may be made separately and welded or otherwise secured in position thereon. Preferably the outer edges of the fins 11 are not secured to the outer tube 12 so as to allow for thermal expansions and contractions when the shielding device 8 is subjected to hot coolant.

The channel 7 in the neutron shield 2 is lined with a tube 13 which extends into the foot 3 and within which the outer tube 12 is a good sliding fit so as to allow no annular gap along which neutrons could stream.

Each shielding device 8 is connected by an upper extension 14 of the outer tube 12 and by an upper extension 15 (see FIGURE 1) of the rod 9 to a biological shield plug 16 (see FIGURE 4) and by a lower extension 17 of the outer tube 12 and a lower extension 18 (see FIGURE 1) of the rod 9 to a train of connected fuel elements 19, shown diagrammatically in FIGURE 4. The fuel elements 19 may be connected to one another by articulated or universal joints 20, and there may be a similar joint 21 between the train of fuel elements 19 and the shielding device 8 or, as shown, the extension 17 thereof. The fuel elements 19 may be, for example, as shown and described in our copending application No. 787,430, wherein suitable articulated joints between fuel elements are also described and shown. The connected biological shield plug 16, shielding device 8 and train of fuel elements 19 can thus be withdrawn from or placed in operative position as a complete unit by the usual charge/discharge machine operating at the charge face of the reactor. The tube 13 extends upwardly via a hot header 22 (see FIGURE 4) to an access or charge tube (not shown) normally sealed by the shield plug 16, the coolant passing into the header 22 preparatory to passing to a heat exchanging device (not shown).

The neutron shield 2 is preferably formed from alternate layers of boron steel and graphite, as illustrated in FIGURE 1.

It will be appreciated that the gaseous coolant has a relatively unrestricted passage up each channel 7 in the neutron shield 2, the helical fins 11 allowing comparatively streamline flow and thereby avoiding substantial pressure drop across the shield 2, whilst providing a number of scattering obstacles to neutrons attempting to stream upwardly through the channel 7 in their characteristic straight line trajectories. The material from which the rod 9, tubular member 10, fins 11 and outer tube 12 is fabricated need not be of neutron absorbing properties such as boron steel is but can be of stainless steel since its function is primarily one of scattering so far as neutrons are concerned. It will be appreciated that where the material of the shielding device 8 is not neutron absorbing in property, the shield 2 will need to have increased capacity for neutron absorption compared with the case where neutron absorbing shield plugs are employed in the channels therein. This may be effected by making the neutron shield thicker.

We claim:

1. A nuclear reactor comprising a moderator structure, a first series of coolant flow channels penetrating the moderator structure, said first series of coolant flow channels locating nuclear fuel elements, a neutron shield structure for the moderator structure, a second series of coolant flow channels penetrating said neutron shield structure and aligned with said first series of coolant flow channels in said moderator structure, barriers of steel in said second series of channels in the shield structure, said barriers comprising a central rod, a plurality of helically wound ribs of the same pitch and direction on said central rod, said ribs extending to the walls of the second series of channels in the shield structure whereby the ribs allow passage of coolant but impede passage of neutrons.

2. A nuclear reactor comprising a moderator structure, a first series of coolant flow channels locating nuclear fuel elements penetrating the moderator structure, said first series of coolant flow channels being vertically oriented, a neutron shield structure above the moderator structure, a second series of coolant flow channels penetrating said neutron shield structure and aligned with the first series of channels, barriers in the second series of channels, said barriers being of a material for filling primarily a neutron scattering function, said barriers comprising a central rod having a plurality of helically wound ribs thereon, said ribs being of the same pitch and direction and extending to the walls of the second series of channels, whereby the barriers allow passage of coolant but impede passage of neutrons, a biological shield structure above the neutron shield structure, fuel element access passages penetrating said biological shield structure, shielding plugs sealing said fuel element access passages, support means for said barriers depending from said shielding plugs and support means for said nuclear fuel elements depending from said barriers.

3. A nuclear reactor comprising a moderator structure of graphite, a first series of coolant flow channels penetrating the moderator structure, said first series of coolant flow channels locating nuclear fuel elements, a neutron shield structure for the moderator structure, said neutron shield structure being composed of alternate layers of boron steel and graphite, said layers being disposed in a plane transverse to the axes of the first series of channels, a second series of coolant flow channels penetrating said neutron shield structure and aligned with said first series of coolant flow channels, barriers of stainless steel in said second series of channels, said barriers comprising a central rod, a plurality of helically wound ribs of the same pitch and direction on said central rod, said ribs extending to the walls of the second series of channels whereby the ribs allow passage of coolant but impede passage of neutrons.

References Cited in the file of this patent

UNITED STATES PATENTS

| | | |
|---|---|---|
| 2,736,696 | Wigner et al. | Feb. 28, 1956 |
| 2,796,529 | Morrison | June 18, 1957 |
| 2,861,034 | Wigner et al. | Nov. 18, 1958 |
| 2,870,075 | Leverett et al. | Jan. 20, 1959 |
| 2,975,118 | Tognoni | Mar. 14, 1961 |
| 2,985,576 | Hollings | May 23, 1961 |
| 3,000,728 | Long et al. | Sept. 19, 1961 |

FOREIGN PATENTS

| | | |
|---|---|---|
| 803,708 | Great Britain | Oct. 29, 1958 |